(12) United States Patent
André et al.

(10) Patent No.: US 7,010,277 B1
(45) Date of Patent: Mar. 7, 2006

(54) ARRANGEMENT AND METHOD FOR INTERFERENCE CANCELLING

(75) Inventors: Tore André, Älvsjö (SE); Uno Torstensson, Östhammar (SE)

(73) Assignee: Telefonaktebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/807,924

(22) PCT Filed: Oct. 13, 1999

(86) PCT No.: PCT/SE99/01845

§ 371 (c)(1),
(2), (4) Date: Aug. 21, 2001

(87) PCT Pub. No.: WO00/25434

PCT Pub. Date: May 4, 2000

(30) Foreign Application Priority Data

Oct. 23, 1998 (SE) .................................. 9803642

(51) Int. Cl.
*H04B 1/04* (2006.01)
(52) U.S. Cl. .................. 455/114.2; 455/63.1; 455/296; 455/304
(58) Field of Classification Search ................ 375/254, 375/346; 379/399.01, 414, 416, 417; 455/63.1, 455/114.2, 296, 570, 304
See application file for complete search history.

(56) References Cited

U.S. PATENT DOCUMENTS

| | | | | | |
|---|---|---|---|---|---|
| 4,434,505 | A | * | 2/1984 | Gutleber | 455/501 |
| 4,608,569 | A | * | 8/1986 | Dickey et al. | 342/384 |
| 4,760,540 | A | * | 7/1988 | Yuen | 708/322 |
| 4,952,193 | A | * | 8/1990 | Talwar | 455/63.1 |
| 4,995,104 | A | * | 2/1991 | Gitlin | 370/201 |
| 4,996,484 | A | * | 2/1991 | Spies | 324/334 |
| 5,047,736 | A | * | 9/1991 | Ghose | 333/12 |
| 5,212,829 | A | * | 5/1993 | Brinkhaus | 455/296 |
| 5,325,394 | A | * | 6/1994 | Bruckert | 375/148 |
| 5,920,539 | A | * | 7/1999 | Schell et al. | 720/658 |
| 6,157,685 | A | * | 12/2000 | Tanaka et al. | 375/346 |
| 6,332,028 | B1 | * | 12/2001 | Marash | 381/92 |
| 6,483,923 | B1 | * | 11/2002 | Marash | 381/92 |

FOREIGN PATENT DOCUMENTS

| | | |
|---|---|---|
| EP | 0462699 A2 | 12/1991 |
| EP | 0773643 A2 | 5/1997 |
| GB | 2169477 A | 7/1986 |
| WO | WO97/40587 | 10/1997 |

* cited by examiner

*Primary Examiner*—Bing Q. Bui
(74) *Attorney, Agent, or Firm*—Roger Burleigh

(57) ABSTRACT

The present invention relates to an apparatus for cancellation of electromagnetic interferences (n), including means (3) for dividing a reference signal ($s_c$) into a first and second signal ($s_{cI}$, $s_{cQ}$) having different phases, tow multipliers (4, 5) for each multiplying a weight coefficient to one of the phase displaced signals ($s_{cI}$, $s_{cQ}$) each and for outputting a multiplied signal each, and adder (6) for adding the two multiplied signals and for outputting a corrected reference signal ($s_n$), and a subtracter (7) for subtracting the corrected reference signal ($s_n$), from an input signal ($s_d$) and for outputting an error signal ($s_e$). According to the invention different weight coefficients (I(f), Q(f)) are used for different frequencies or frequency bands (f) of the interference (n).

27 Claims, 4 Drawing Sheets

ARRANGEMENT AND METHOD FOR INTERFERENCE CANCELLING

TECHNICAL FIELD

The present invention relates to a method and a device for cancellation of electromagnetic interference.

DESCRIPTION OF RELATED ART

Is has become common to transmit data at high rate using common telephone lines. One of the numerous standards used for this is termed VDSL (Very high speed Digital Subscriber Line), see ETSI "DTS/TM-06003-1 (draft) V0.0.6 (1997-11)". The frequency band used ranges from 0,5 to 10 MHz.

One occurring problem is that several amateur radio frequency bands are located in the same frequency range as VDSL, namely 1,8–2,0 MHz, 3,5–3,8 MHz, 7.0–7.1 MHz and 10,10–10,15 MHz. In each of these frequency bands the radio amateur uses narrow band signals, usually having a bandwidth less than 4 kHz. The radio amateur can transmit nearby telephone lines using very high power levels, typically up to 400 W and even higher in some countries. Therefore, high magnitude interference can be introduced in the telephone lines. The interference presents large variations in characteristic over time due to the fact that amateur radio transmissions uses a single side band. Moreover, the interference can be present in any part of the amateur radio frequency bands at any time of day depending on when and to whom the radio amateur transmits.

It is common to use a pair-twined cable for telephone lines and to transmit the signals differentially. Interference from outside will then theoretically interfere with both wires in a pair equally much and thus not be noticed at all if the signals are transmitted differentially. In practice, it is however impossible to make the two wires entirely identical, resulting that strong signals from amateur radio transmissions and similar still become noticeable.

The corresponding problem to amateur radio transmissions of course occurs also in other similar contexts, such as cable television networks. Furthermore, similar problem can arise from radio pirates, which moreover do not follow any rules at all, neither regarding frequency band nor regarding output power. The problem of interference from radio pirates in the cable television network is described in detail in IEEE Communications Magazine, April 1987, Vol. 25, No. 4, Schreen & Arnbak "Interference Protection of Cable Networks Against Radio Pirates".

In the paper by Scheerens & Arbaks it is also showed how one has tried to avoid the problem in cable television networks. The basic idea is to, besides the original antenna, also use a reference antenna, which is directed towards the interference source/radio pirate. The signal received from the reference antenna is given a complex weighting so that phase and amplitude are adjusted. Thereupon, the weighted reference signal is subtracted from the original signal in the original antenna so that the interference is eliminated. However, this approach only takes care of one interference source at the time under static conditions.

A more advanced version shown in the paper by Scheerens & Arnbaks relies on adaptive weighting. Two synchronous detectors are used to correlate the signal from the original antenna with 0°–90°-components, respectively, in the signal from the reference antenna. Thereupon these correlated signals are integrated and fed as control signals to a complex phase modulator acting as a kind of control circuit being feed-backed connected and which provides an output signal which is added to the signal from the original antenna. In this manner it is possible to control amplitude and phase for the incoming signal from the original antenna, thereby eliminating the interference.

In WO 97/40587 a version for use in telephony where it is not necessary to know from which direction the interference arrive, is shown. An incoming pair-twined telephone cable is connected to a transformer, which transforms the incoming signal into a differential signal and a common mode signal. The common mode signal, which is a measurement of the interfering signal, is obtained by means of for example using the centre terminal on the input side of the transformer and using ground as reference. The differential signal and the common mode signal are fed to a radio frequency canceller, which, using a filter, generates an interference cancelled differential signal, which is A/D converted and processed in a digital signal processor in order to obtain the data originally transmitted. The digital signal processor also generates an update control signal which is fed back to the radio frequency canceller and which is activated during so called "silent periods" in the transmission, i.e. during times when no data is transmitted.

The radio frequency canceller also includes a subtracter, which subtract an estimated interference signal from the differential signal and outputs the interference cancelled differential signal. The radio frequency canceller also includes an updating circuit, which receives the updating control signal and which allows the interference cancelled differential signal to pass during the silent periods for feedback to an adaptive filter, which receives the common mode signal and the interference can-celled differential signal and which generates the estimated interference signal.

The adaptive filter includes a phase shifter, which obtains the 0°- and 90°-components of the common mode signal. Each of the signal components is multiplied with the interference cancelled differential signal and is integrated. The results are again multiplied to the respective component and added to each other, thus obtaining the estimated interference signal.

A drawback of this method is that it is slow and that updating only can take place during the silent periods.

DETAILED DESCRIPTION

A problem of the solution in WO 97/40587 is that updating only can take place during the silent periods. Another problem is that the solution in WO 97/40587 works well as long as the interference has the same frequency, but when the frequency changes an adaptation has to take place, which takes time.

The object of the present invention is to solve the above problems by means of making the interference cancelling dependent upon the frequency in the interference. The invention includes a means, for example a phase shifter, for splitting a reference signal into a first and a second signal having different phases, preferably having a phase difference of 90°. The invention further includes two multipliers for multiplying one weight coefficient each with one of the phase displaced signals each and for outputting one multiplied signal each. Preferably an LMS-calculation (Least Mean Square) is used to obtain the weight coefficient. Further more, the invention includes an adder for adding the two multiplied signals and for outputting a corrected reference signal and a subtracter for subtracting the corrected reference signal from an input signal and for outputting an error signal. The interference cancelling is dependent upon the frequency of the interference by using different weight coefficients for different frequencies or frequency bands of the interference.

The advantage is that for each new frequency or frequency band of the interference, a new basic value for the weight coefficients can quickly be chosen, which is suitable for this particular frequency or frequency band. This can take place at any time, not only during silent periods. Fine-tuning can then take place within this frequency or this frequency band, which for the best result should take place during silent periods or very slowly during transmission. When the weight coefficients once have been set to the basic values for a particular frequency there is normally not much need for fine-tuning, which makes it a considerably quicker method than if the adaptation of weight coefficients had taken place continuously.

As an example of an application, the reference signal can be a common mode signal of a data signal, which for example can be telephony, video or pure data, whereas the input signal can be a differential signal of the same data signal. The error signal then becomes an interference cancelled version of the data signal.

The invention will now be described in more detail by means of preferred embodiments and with reference to the accompanying drawings.

DETAILED DESCRIPTION

Figure 1:
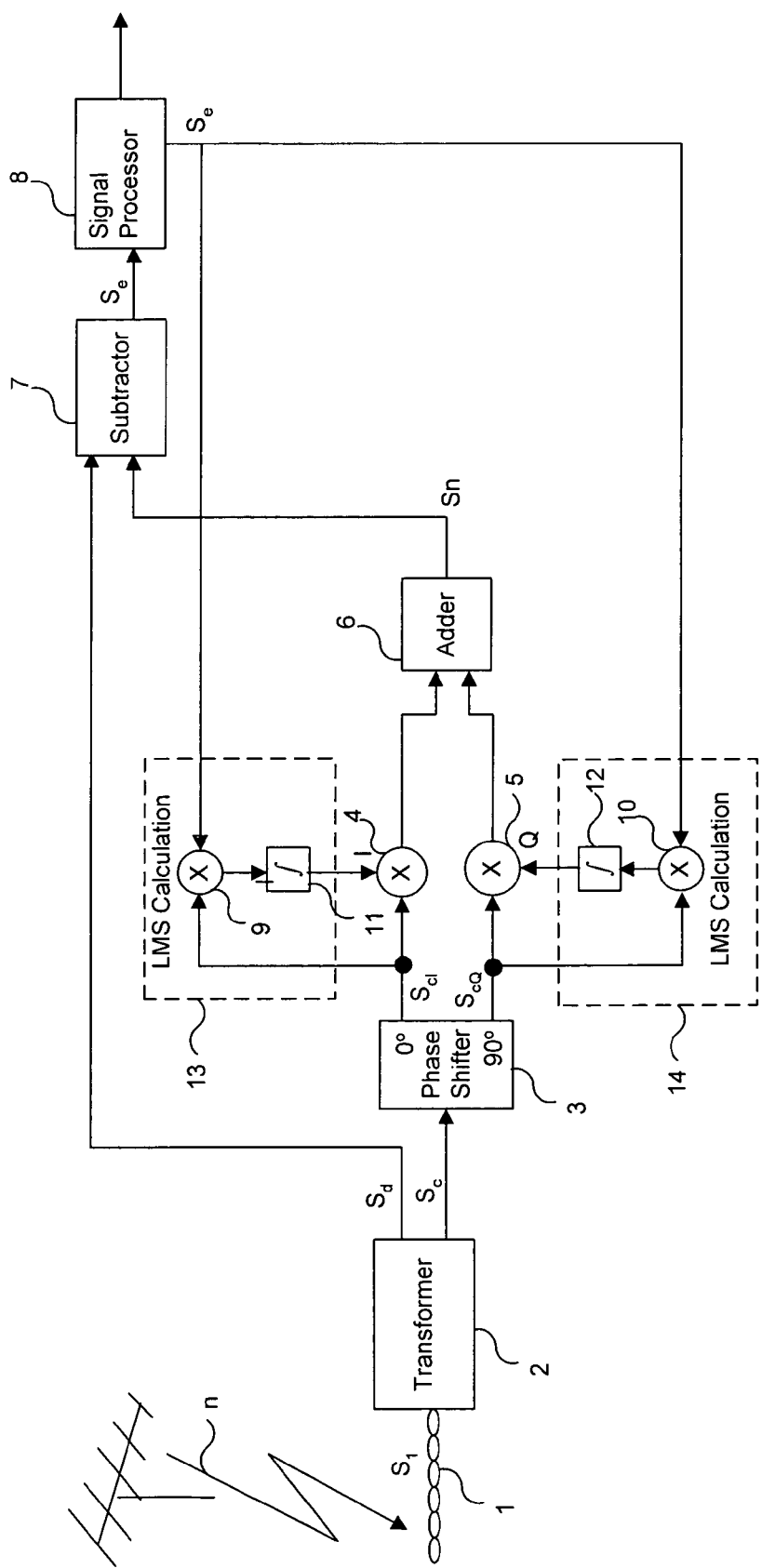
FIG. 1 shows a diagram of prior art for interference cancellation.

In FIG. 1 a simplified version of prior art according to WO 97/40587 is shown. The prior art will however be explained using a new terminology and partly using another basis than in WO 97/40587. A part of the invention is realising how it actually works and doesn't work, which is not always explained in WO 97/40587.

An interfering signal n interferes with an incoming twin pair telephone cable 1 connected to a transformer 2, which converts an incoming line signal $s_1$ into a differential signal $s_d$ and a common mode signal $s_c$. The common mode signal $s_c$, which is a measurement of the interfering signal, can for example be obtained by means of choosing the centre terminal of the input side of the transformer and using ground as reference, by means of using one of the lines in the twined pair or by means of obtaining the sum of the two lines using ground as reference. It is preferred to use the first alternative.

The common mode signal $s_c$ is fed to a phase shifter 3, which output 0°- and 90°-components $s_{cI}$, $s_{cQ}$ of the common mode signal $s_c$. Thereupon the components $s_{cI}$, $s_{cQ}$ are multiplied with a weight coefficient I, Q each in multipliers 4, 5 in order to finally be added in an adder 6. The term weight coefficients is not used in WO 97/45087, but is introduced here since the term is required in order to explain the present invention.

Choosing suitable values for the weight coefficients I, Q results in an estimated interference signal $s_n$ after the addition, which then can be subtracted from the differential signal $s_d$ in a subtracter 7 and then obtain an interference cancelled signal $s_e$ from which it's possible to extract telephony data using i.a. a signal processor 8.

The weight coefficients I, Q are obtained using an LMS-calculation 13, 14 (Least Mean Square). It is performed by feeding back the interference cancelled signal $s_e$ during the silent periods of the transmission to two multipliers 9, 10 where it in each multiplier is multiplied to one of the two common mode signal components $s_{cI}$, $s_{cQ}$ and then integrated in an integrator 11, 12 thereby obtaining the weight coefficients I, Q.

The mathematical background to why an LMS-calculation is suitable can be found in WO 97/40587 or in "IEEE Journal of Solid-state Circuits", vol. 30, No. 12, December 1995, page 1391–1398 "Analog CMOS Implementation of High Frequency Least Mean Square Error Learning Circuit" by Kub and Justh.

Silent periods are periods when no data are transmitted in any direction and can be used e.g. to separate communication in two different directions.

Figure 2:
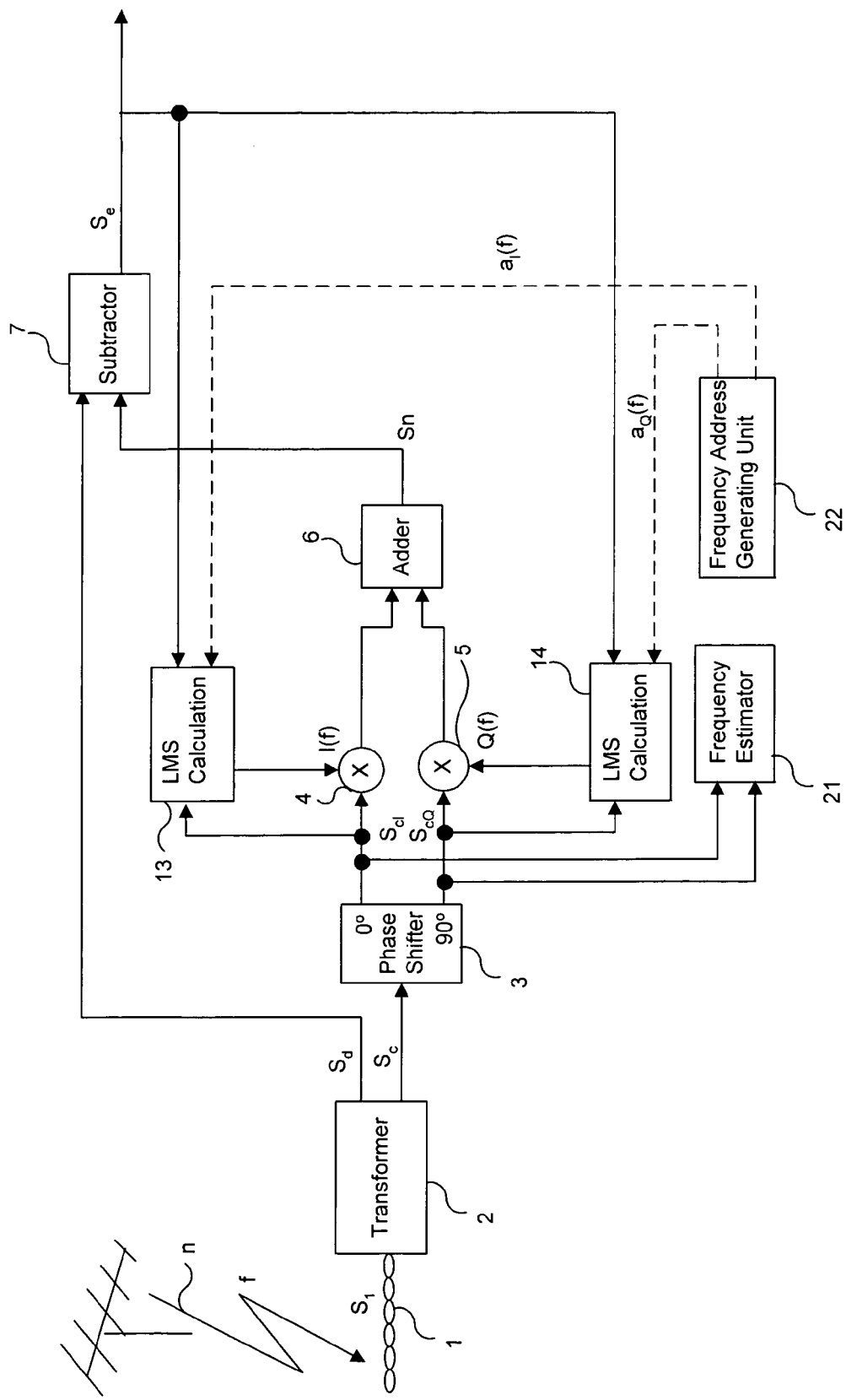
FIG. 2 shows a diagram of a first embodiment of the present invention.

The present invention, which is shown in FIG. 2, is based on the prior art described in conjunction with FIG. 1. However, the function to only update during silent periods is not necessary in the same way, which will be explained in more detail below.

In WO 97/40587 it is not disclosed that it is not necessary to use particularly the 0°- and 90°-components in the line signal. It works as long as two vectors having different phase angles are obtained and which makes it possible to extract all other phase angles and amplitudes if they each first are multiplied with the weight coefficients and then added to each other. In practice it has however turned out that the best result is obtained if the 0°- and 90°-components are used.

Further, it is not necessary to only use one signal processor as described in WO 97/40587, or to locate it where it is located in WO 97/40587, but some form of receiver is suitably provided which in one way or another receives the interference cancelled signal se. Since the location of the receiver is of no importance in the present invention it is not shown in FIG. 2.

Furthermore, it should be noticed that the interference problem can be generalised, as in the paper cited above by Kubs and Justh. The common mode signal $s_c$ there corresponds to a reference signal $s_c$, the differential signal $s_d$ to an input signal $s_d$ and the interference cancelled signal $s_e$ to an error signal $s_e$. These general terms will therefore be used in the following description.

Also, it is not mentioned in the prior art cited above that it would work also with other ways of implementing LMS-algorithms could be used, and that even other types of algorithms could be used. In the basic LMS-algorithm a coefficient C is updated according to:

$$C_{k+1} = C_k + \mu \cdot s_e \cdot s_c \quad (1)$$

where $\mu$ is an adaptation constant and usually is a small power of 2.

It can however be suitable to use another type of sign algorithm due to the fact that few or no actual multiplications are used, which make them easy to implement. An example of such an algorithm can look like:

$$C_{k+1} = C_k + \mu \cdot s_e \cdot \text{sign}(s_c) \quad (2)$$

Another version of a sign algorithm can look like:

$$C_{k+1} = C_k + \mu \cdot s_c \cdot \text{sign}(s_e) \quad (3)$$

The simplest LMS-algorithm is the sign—sign algorithm. A coefficient C is then updated according to the formula:

$$C_{k+1} = C_k + \mu \cdot \text{sign}(s_e) \cdot \text{sign}(s_c) \quad (4)$$

In FIG. 2 an embodiment of the present invention is shown. It includes all elements from FIG. 1 with exception of the signal processor 8. Further, the LMS-calculating units 13, 14 are generalised. In order to avoid having to make a new adaptation each time the interference change frequency the weight coefficients I, Q are made frequencies dependent, i.e. in practise they become different weight coefficients I(f), Q(f) for the different frequencies or frequency bands f of the interference. If, as an example, the sign—sign algorithm (4) above is used the formulas for the weight coefficients I(f), Q(f) become:

$$I_{k+1}(f) = I_k(f) + \mu_I \cdot \text{sign}(s_f) \cdot \text{sign}(s_c) \quad (5a)$$

$$Q_{k+1}(f) = Q_k(f) + \mu_Q \cdot \text{sign}(s_f) \cdot \text{sign}(s_c) \quad (5b)$$

where k=1, 2, . . .

The corresponding change can of course also be made in the formulas (1), (2) or (3), and in other formulas which could be found useful in this context. A concrete example of how the formulas can be used in the apparatus according to the invention is described in more detail below.

For each new frequency or frequency band f of the interference a new basic value, which is suitable for this particular frequency or frequency band f, can quickly be chosen for the weight coefficients I(f), Q(f). This can take place at any time, not only during silent periods. Fine-tuning can then take place within this frequency or frequency band f according to the formulas (5a) and (5b) or corresponding formulas, which in order to obtain the best result should take place during silent periods or be carried out very slowly during transmission. When the weight coefficients I(f), Q(f) once have been set to the basic values for a particular frequency, there is however normally no need for much fine tuning, which makes it a much quicker method then if the adaptation of the weight coefficients I, Q had taken place continuously.

One way of changing the weight coefficients I(f), Q(f) for each frequency can be a large filter for all frequencies, which would become complex and expensive and require quantisation and A/D-conversion. The solution according to FIG. 2 is significantly simpler and less costly and can be made analogue all the way—phase shifter 3, multiplier 4, 5 adder 6 and subtracter 7—which is an advantage since quantising noise can be introduced during A/D- and D/A-conversions.

In order to determine which weight coefficients I(f), Q(f) that should be used, the apparatus is suitably provided with a frequency estimator 21, which estimates the frequency f of the interference n. Each time the interference n changes frequency f more than a pre-set frequency difference, new values of the weight coefficients I(f), Q(f) are chosen. The different values can be stored in a memory and the frequency estimator 21 generates an estimated frequency, which is used in a frequency address generating unit 22 in order to chose one or several addresses $a_{I(f)}$, $a_{Q(f)}$ in the memory. The frequency estimator 21 can for example be a simple frequency counter or any other more sophisticated device, whereas the frequency address generating unit 22 for example can use a simple look up table between frequency and address. It can be an advantage, but is not necessary, to use both the components $s_{cI}$, $s_{cQ}$ of the reference signal/common mode signal $s_c$.

Figure 3:
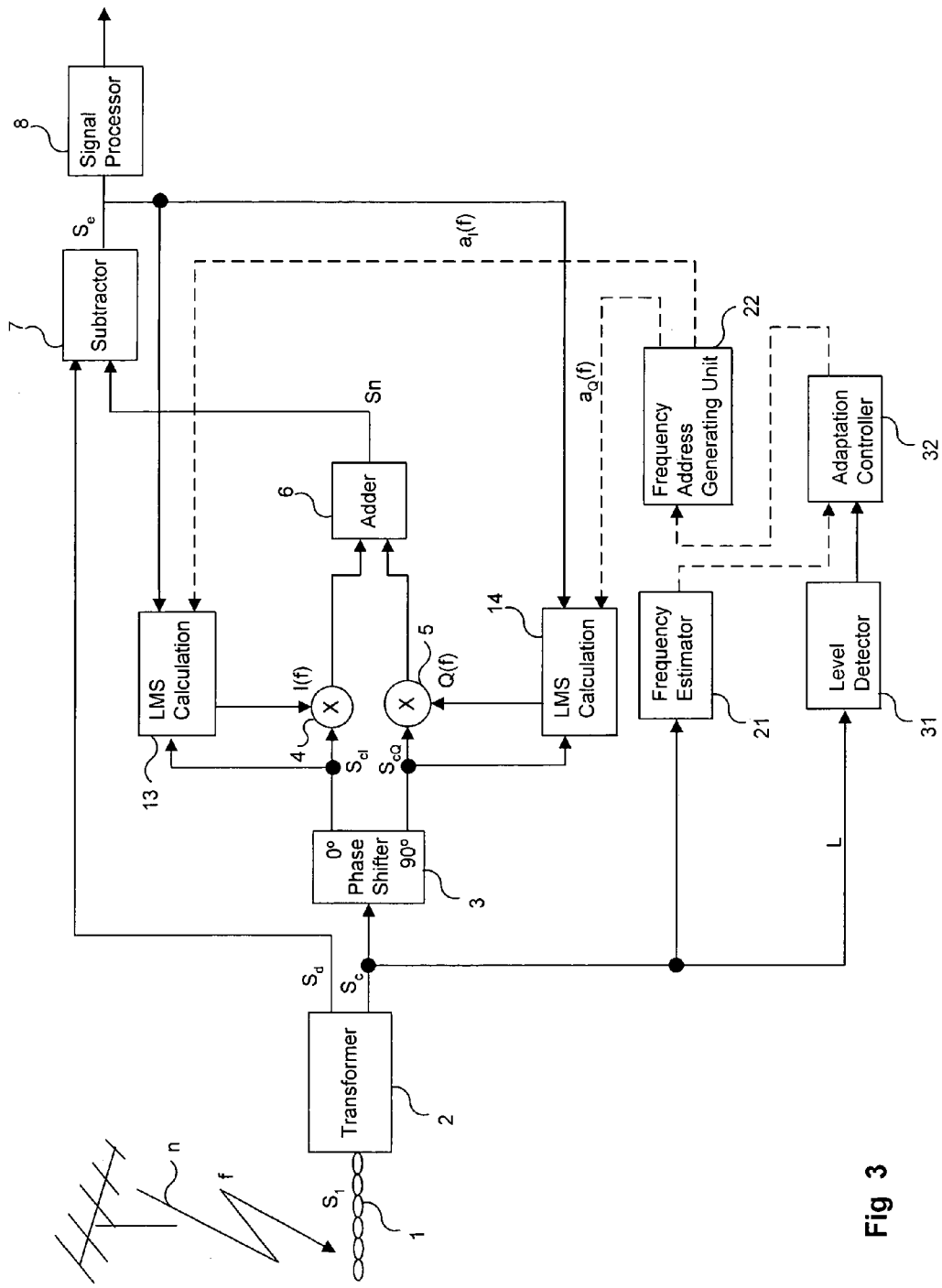
FIG. 3 shows a diagram of a second embodiment of the present invention.

Since it strictly is only necessary to update when a strong enough interference is present a level detector 31 can be introduced, see FIG. 3. The level detector 31 reads the level L of the reference signal/common mode signal $s_c$. When the level L has risen over a certain threshold value $L_c$, the level detector 31 indicates that updating shall take place to an adaptation controller 32, which also receives the estimated frequency from the frequency estimator 21. When an update is to take place the adaptation controller 32 indicates this to the frequency address generating unit 22, which then generates new addresses $a_{I(f)}$, $a_{Q(f)}$. As an alternative updating takes place when the level has been above the threshold value for a certain period of time. This can also be generalised to a common controlling if updating is to take place or not. For example, there can be different interference at different frequencies and at different levels at the same time, so that particular consideration must be taken. If a receiver 9 is used it is also possible that the receiver 9 signals to the adaptation controller 32 when silent periods occur if it is desirable to consider this.

It should be noticed that FIG. 3 also illustrates an alternative way to connect the frequency estimator 21, namely directly to the reference signal/common mode signal $s_c$.

Figure 4:
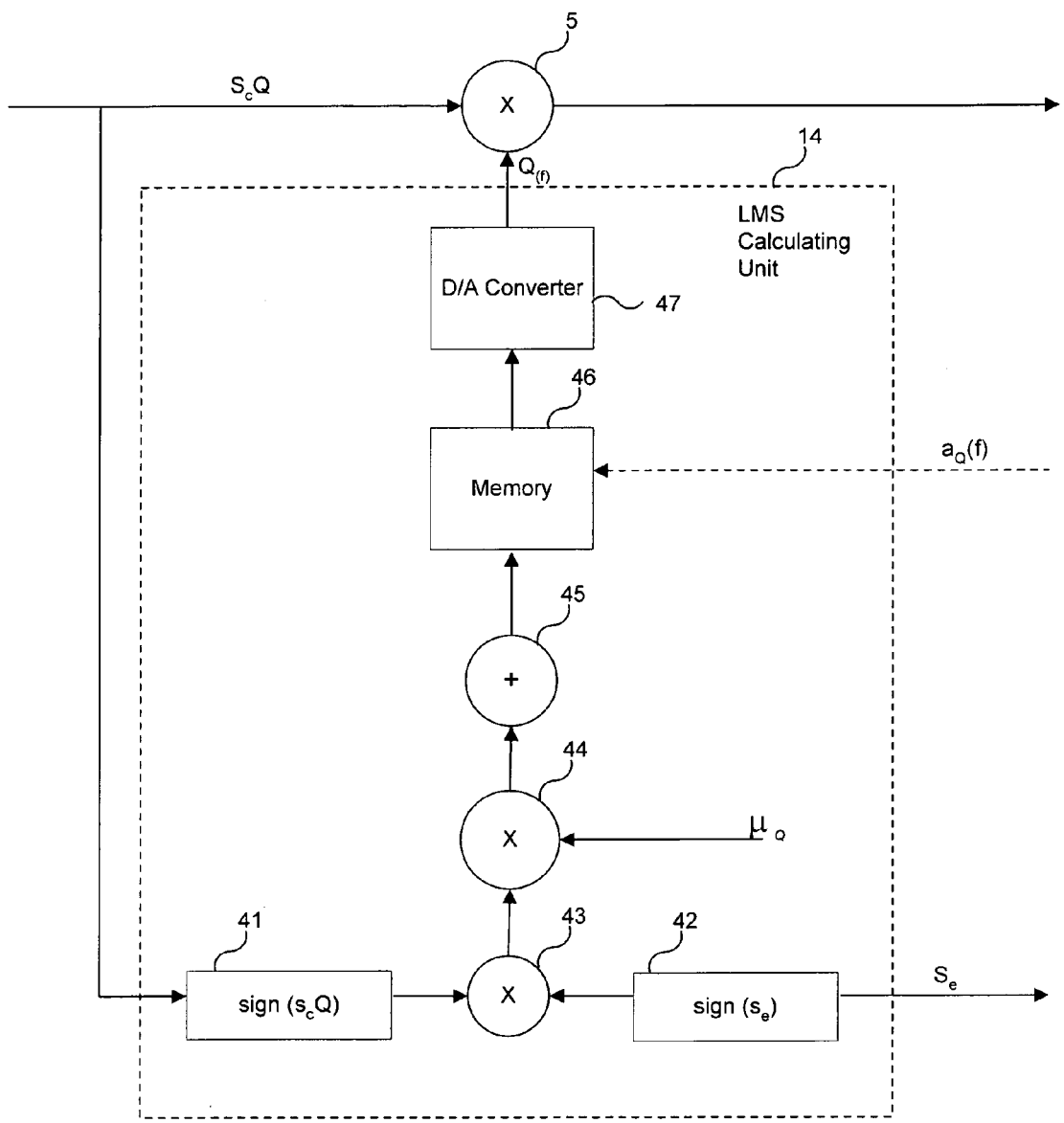
FIG. 4 shows a diagram of an embodiment of a detail in FIGS. 2 and 3.

In FIG. 4 it is shown how the formula (5b) can be implemented in practise. The formula (5a) is then implemented in the corresponding way. This part of the invention is suitably implemented digitally. In an LMS-calculating unit 14 the sign 41 of the reference signal/common mode signal $s_cQ$ is multiplied to the sign 42 of the error signal/the interference cancel signal $s_e$ in a "multiplier" 43. Of course, no actual multiplication needs to be carried out, it is only a question of changing sign. The resulting sign is multiplied to the adaptation constant $\mu_Q$ in another fictitious "multiplier" 44, i.e. the sign is changed on the adaptation constant $\mu_Q$. The result is added in an adder 45 to a memory 46 where the address $a_{Q(f)}$ is chosen by the frequency address generating unit 22, and is D/A converted in a D/A converter 47, thereby obtaining a weight coefficient Q(f) which can be multiplied in the multiplier 5 to the reference signal $s_cQ$. The multiplications can for example be implemented using XOR-gates and the multiplication with the adaptation constant $\mu_Q$ can for example be implemented as a shift operation.

The invention as described above can besides being used for cancelling interference from radio amateurs, radio pirates and the like also be used in other areas where it is desired to cancel electromagnetic interference, in particular interference having a small bandwidth.

What is claimed is:

1. Arrangement for cancellation of electromagnetic interference (n), including means (3) for dividing a reference signal ($s_c$) into a first and a second signal ($s_{cI}$, $s_{cQ}$) having different phases, two multipliers (4, 5) for each multiplying a weight coefficient to one of the phase displaced signals ($s_{cI}$, $s_{cQ}$) each and for outputting a multiplied signal each, an adder (6) for adding the two multiplied signals and for outputting a corrected reference signal ($s_n$) and a subtracter (7) for subtracting the corrected reference signal ($s_n$), from an input signal ($s_d$) and for outputting an error signal ($s_e$), characterized in that the arrangement includes means (21, 22) for generating different weight coefficients (l(f), Q(f)) for different frequencies or frequency bands (f) of the interference (n).

2. Arrangement according to claim 1, characterized in that the reference signal dividing means ($s_c$), the multipliers (4, 5), the adder (6) and the subtracter (7) are analogue.

3. Arrangement according to claim 1, characterized in that the interference canceller further includes two least mean square calculating units (13, 14) each being arranged for, for different frequencies, or frequency bands (f) of the interference (n), receiving the error signal ($s_e$) and a phase displaced signal ($s_{cI}$, $s_{cQ}$) each, implementing a least mean square algorithm and outputting a weight coefficient (I(f), Q(f)) each.

4. Arrangement according to claim 3, characterized in that the least mean square calculating units (13, 14) are arranged to generate a new value of the weight coefficient (I(f), Q(f)) by using an adaptation constant ($\mu$) multiplied with the phase displaced signal ($s_{cI}$, $s_{cQ}$) and the error signal ($s_e$) and add the old value of the weight coefficients (I(f), Q(f)).

5. Arrangement according to claim 3, characterized in that the least mean square calculating unit is arranged to generate a new value for the weight coefficients (I(f), Q(f)) by using an adaptation constant ($\mu$) multiplied with the error signal ($s_e$) and sign adjusted with the sign of the phase displaced signal ($s_{cI}$, $s_{cQ}$) and add the old value of the weight coefficients (I(f), Q(f)).

6. Arrangement according to claim 3, characterized in that the least mean square calculating unit is arranged to generate a new value for the weight coefficient (I(f), Q(f)) by means of using an adaptation constant ($\mu$) sign adjusted with the sign of the phase displaced signal ($s_{cI}$, $s_{cQ}$) and the sign of the error signal ($s_e$) and add the old value of the weight coefficients (I(f), Q(f)).

7. Arrangement according to claim 3, characterized in that the least mean square calculating unit is arranged to generate a new value for the weight coefficient (I(f), Q(f)) by using an adaptation constant ($\mu$) multiplied with the phase displaced signal ($s_{cI}$, $s_{cQ}$) and sign adjusted with the sign of the error signal ($s_e$) and adding the old value of the weight coefficients (I(f), Q(f)).

8. Arrangement according to claim 1, characterized in that reference signal dividing means (3) is a phase shifter.

9. Arrangement according to claim 1, characterized in that phase difference between the phase displaced signals ($s_{cI}$, $s_{cq}$) is 90.

10. Arrangement according to claim 9, characterized in that the phase displaced signals ($s_{cI}$, $s_{cQ}$) are 0°- and 90°-components of the reference signal ($s_c$).

11. Arrangement according to any of claim 1, characterized in that the weight coefficient generating means (21, 22) includes a frequency estimator (21) for estimating the frequency or frequency band (f) of the interference and a frequency address generating unit (22) for indicating at least one address ($a_{I(f)}$, $a_{Q(f)}$) in at least one weight coefficient memory (46) in response to the frequency or frequency band of the interference.

12. Arrangement according to claim 11, characterized in that the frequency estimator (21) is a zero crossing frequency counter.

13. Arrangement according to claim 11, characterized in that the frequency estimator (21) is arranged to estimate the frequency or frequency band (f) of the interference directly from the reference signal ($s_c$).

14. Arrangement according to claim 11, characterized in that the frequency estimator (21) is arranged to estimate the frequency or frequency band (f) of the interference in at least one of the phase displaced signals ($s_{cI}$, $s_{cQ}$).

15. Arrangement according to claim 1, characterized in that interference canceller further includes a level detector (31) and an adaptation controller (32), which are provided for enabling changing of the weight coefficients (I(f), Q(f)) in response to the level (L) of the reference signal ($s_c$).

16. Arrangement according to claim 1, characterized in that the reference signal ($s_c$) is a common mode signal of a data signal ($s_1$), that the input signal (Sd) is a differential signal of the data signal ($s_1$) and that the error signal ($s_e$) is a interference cancelled version of the data signal ($s_1$).

17. Method of cancellation of electromagnetic interferences (n) including the following steps:
dividing a reference signal ($s_c$) into a first and a second signal having different phases ($s_{cI}$, $s_{cQ}$);
multiplying the phase displaced signals ($s_{cI}$, $s_{cQ}$) with a weight coefficient each, which results in two multiplied signals;
adding the two multiplied signals, which results in a corrected reference signal ($s_n$);
subtracting the corrected signal ($s_n$) from an input signal ($s_d$), which results in an error signal ($s_e$), characterized in that different weight coefficients (I(f), Q(f)) are used for different frequencies or frequency bands (f) of the interferences (n).

18. Method according to claim 17, characterized in that for each frequency or frequency band (f) of the interferences (n) an least mean square algorithm is applied to the error signal ($s_e$) and one of the phase displaced signal ($s_{cI}$, $s_{cQ}$), which results in one of the weight coefficients (I(f), Q(f)).

19. Method according to claim 18, characterized in that the generation of a new value for the weight coefficient (I(f), Q(f)) is performed by using an adaptation constant ($\mu$) multi-plied to the phase displaced signal ($s_{cI}$, $s_{cQ}$) and the error signal ($s_e$) and adding the old value of the weight coefficient (I(f), Q(f)).

20. Method according to claim 18, characterized in that the generation of a new value for the weight coefficient (I(f), Q(f)) is performed using an adaptation constant ($\mu$) multi-plied with the error signal ($s_e$) and sign adjusted with the sign of the phase displaced signal ($s_{cI}$, $s_{cQ}$) and adding the old value of the weight coefficient (I(f), Q(f)).

21. Method according to claim 18, characterized in that generation of a new value for the weight coefficient (I(f), Q(f)) is performed by using an adaptation constant ($\mu$) sign adjusted with the sign of the phase displaced signal ($s_{cI}$, $s_{cQ}$) and the sign of the error signal ($s_e$) and adding the old value of the weight coefficients (I(f), Q(f)).

22. Method according to claim 18, characterized in that generation of a new value for the weight coefficients (I(f), Q(f)) is performed using an adaptation constant ($\mu$) multi-plied with the phase displaced signal ($s_{cI}$, $s_{cQ}$) and sign adjusted with the sign of the error signal ($s_e$) and adding the old value of the weight coefficient (I(f), Q(f)).

23. Method according to claim 17, characterized by estimation of the frequency or frequency band (f) of the interference, and indication of two addresses ($a_{I(f)}$, $a_{Q(f)}$) in at least one weight coefficient memory (46) in response to the frequency or frequency band (f) of the interference.

24. Method according to claim 23, characterized in that estimation of the frequency or frequency band (f) of the interference is performed directly from the reference signal ($s_c$).

25. Method according to claim 23, characterized in that estimation of the frequency or frequency band (f) of the interference is performed from at least one of the phase displaced signals ($s_{cI}$, $s_{cQ}$).

26. Method according to claim 17, characterized in that a change of the weight coefficients (I(f), Q(f)) only is allowed when the reference signal ($s_c$) is higher than a threshold value ($L_t$).

27. Method according to claim 17, characterized in that the reference signal ($s_c$) is a common mode signal of a data signal ($s_d$), that the input signal ($s_d$) is a differential signal of the data signal ($s_1$) and that the error signal ($s_e$) is a interference cancelled version of the data signal ($s_1$).

* * * * *

UNITED STATES PATENT AND TRADEMARK OFFICE
CERTIFICATE OF CORRECTION

PATENT NO. : 7,010,277 B1 Page 1 of 1
APPLICATION NO. : 09/807924
DATED : March 7, 2006
INVENTOR(S) : Andre et al.

It is certified that error appears in the above-identified patent and that said Letters Patent is hereby corrected as shown below:

On the Title Page, in Field (57), under "ABSTRACT", in Column 2, Line 4, delete "tow" and insert -- two --, therefor.

On the Title Page, in Field (57), under "ABSTRACT", in Column 2, delete "$(s_{cI}, s_{cQ})$" & "$(I(f), Q(f))$" and insert -- $(s_{cI}, s_{cQ})$ -- & -- $(I(f), Q(f))$ --, therefor at each occurrence.

Col. 6 line 49 – Col. 8 line 59 In the Claims, delete "$(s_{cI}, s_{cQ})$", "$(I(f), Q(f))$ & "$(a_{I(f)},$" and insert -- "$(s_{cI}, s_{cQ})$ --, -- $(I(f), Q(f))$ -- & -- $(a_{I(f)},$ --, therefor at each occurrence.

In Column 7, Line 66, in Claim 16, delete "(Sd)" and insert -- $(S_d)$ --, therefor.

Signed and Sealed this

Sixteenth Day of February, 2010

David J. Kappos
*Director of the United States Patent and Trademark Office*